(12) United States Patent
Yamashita et al.

(10) Patent No.: US 6,811,316 B2
(45) Date of Patent: Nov. 2, 2004

(54) WATER PUMP BEARING (75) Inventors: Kenichi Yamashita, Okayama (JP); Ai Shiozuka, Okayama (JP)

(73) Assignees: Uchiyama Kogyo Co., Ltd. (JP); FAG Kugelfischer Georg Schafter AG (DE)

(*) Notice: Subject to any disclaimer, the term of this patent is extended or adjusted under 35 U.S.C. 154(b) by 108 days.

(21) Appl. No.: 10/317,242

(22) Filed: Dec. 11, 2002

(65) Prior Publication Data

US 2003/0156772 A1 Aug. 21, 2003

(30) Foreign Application Priority Data

Dec. 11, 2001 (JP) ........................................ 2001-377890

(51) Int. Cl.[7] .............................................. F16C 33/78
(52) U.S. Cl. ...................................... 384/482; 384/486
(58) Field of Search ................................ 384/482, 486, 384/140, 147, 477

(56) References Cited

U.S. PATENT DOCUMENTS 3,788,714 A * 1/1974 Degioia et al. .............. 384/482
4,948,271 A * 8/1990 Nunotani et al. ........... 384/473

* cited by examiner

Primary Examiner—Lenard A. Footland
(74) Attorney, Agent, or Firm—Ostrolenk, Faber, Gerb & Soffen, LLP (57) ABSTRACT A water pump bearing with a seal structure on an impeller side including a ring-shaped first seal unit having its outer circumferential portion fixed to an inner circumferential portion of an outer ring and its inner circumferential portion in sliding-contact with an outer circumferential surface of a pump shaft, and a ring-shaped second seal unit disposed axially outward from the first seal unit with its inner circumferential portion fixed to an outer circumferential portion of the pump shaft and its outer circumferential portion in sliding-contact with the outer ring.

12 Claims, 6 Drawing Sheets

WATER PUMP BEARING

FIELD OF THE INVENTION

The present invention relates to a water pump bearing to be used for a water-cooled engine of an automobile or the like.

DESCRIPTION OF THE RELATED ART

Figure 6:
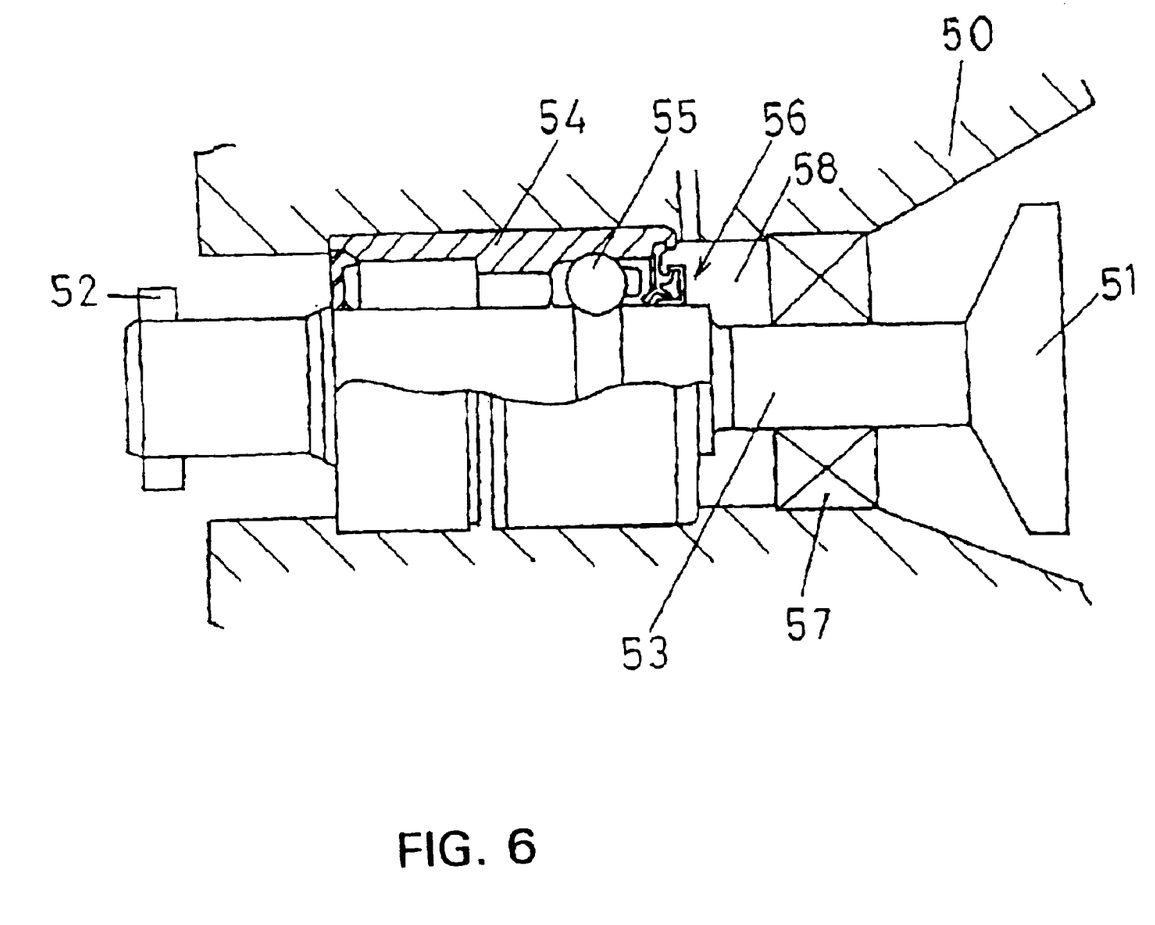
FIG. 6 is a partial cross-sectional view of an example of a water pump in which a conventional water pump bearing is disposed.

Referring to FIG. 6, in a conventional water pump for a water-cooled engine of an automobile or the like, an impeller is attached to an end portion of a pump shaft 53 and a pulley 52 is attached to the other end portion thereof respectively, so that the pulley 52 causes the impeller 51 to rotate, to thereby circulate cooling water. For fixing such a water pump, as shown in FIG. 6, generally a water pump bearing is press-fixed in a water pump housing 50 fixed to a main body of the engine. With the water pump bearing, the pump shaft 53 provided with the impeller 51 at an end portion thereof and the pulley 52 at the other end portion thereof respectively is rotatably attached to an outer ring 54 of the bearing with a rolling member 55 located therebetween.

Between the outer ring 54 and the pump shaft 53, a mechanical seal 57 is provided for sealing a space 58 between the pump housing 50 and the pump shaft 53 to isolate from the impeller 51.

Also, seal structures are respectively provided at the end portions of the outer ring 54, for sealing a space therewithin. Among the seal structures, a seal structure 56 on the impeller side is generally constituted of a metal ring reinforcement and an elastic member reinforced by the ring reinforcement.

In such water pump in the public domain, when sealing effect of the mechanical seal 57 is deteriorated because of chronological transition etc., cooling water may penetrate from the impeller 51 side of the seal 57 into the space 58 between the pump housing 50 and the pump shaft 53.

In addition, the seal structure 56 on the impeller side is repeatedly heated and cooled each time the engine is started and stopped, causing repeated expansion and contraction of air inside the bearing, for which the sealing effect is prone to be damaged.

Accordingly, the cooling water that has penetrated into the space 58 between the pump housing 50 and the pump shaft 53 in the above described manner, or vapor generated from heating the cooling water may penetrate into the internal area of the bearing through the seal structure 56.

Such penetration of moisture into the internal area of the bearing causes a breakdown of the water pump because of deterioration of grease filled inside the bearing or rust produced inside the bearing, shortening a life span of the water pump.

Moreover, the grease may flow out of the internal area of the bearing through the seal structure 56, at which the sealing effect of it has been deteriorated by the aforementioned reasons. The outflow of the grease increases friction between the rolling member 55 and the pump shaft 53, which leads to a breakdown of the water pump bearing, and consequently to a shorter life span of the water pump.

OBJECTS OF THE INVENTION

In view of the foregoing problems with the prior art, it is an object of the present invention to provide a water pump bearing that can prevent penetration of cooling water or moisture into an internal area of the water pump bearing, and outflow of grease from the internal area of the bearing.

SUMMARY OF THE INVENTION

For achieving the object, a water pump bearing according to the invention is constituted as follows.

The water pump bearing comprises, like conventional ones, a pump shaft provided with an impeller at one end portion thereof and a pulley at the other end portion thereof respectively, rotatably attached to an outer ring of the bearing with at least one rolling member located therebetween, and seal structures provided at both end portions of the outer ring for sealing an internal area of the bearing.

Also, there is a seal structure on a side of the impeller, among the seal structures provided at both end portions of the outer ring for sealing the internal area of the bearing, comprises the following characteristic constitution.

Figure 1:
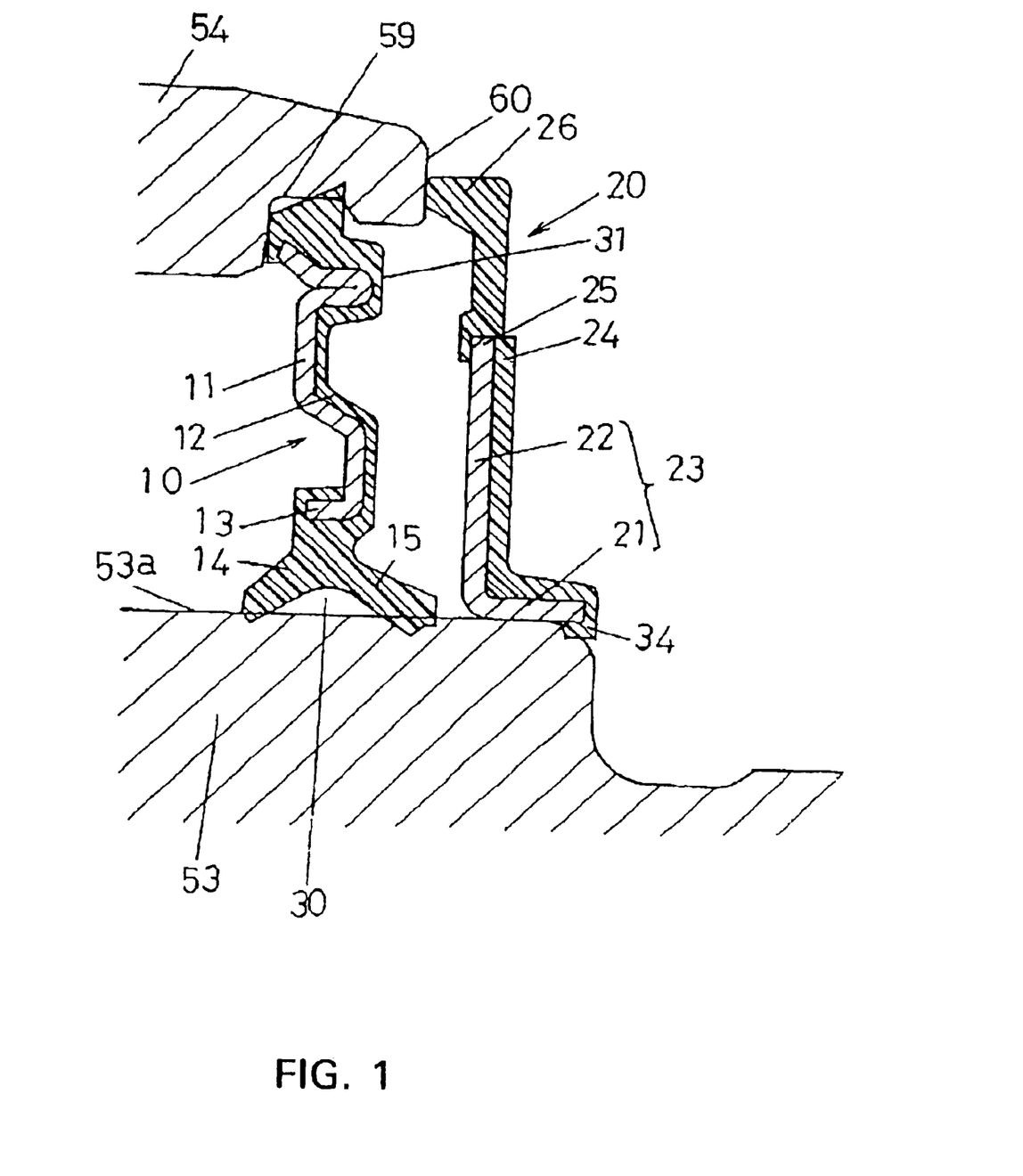
FIG. 1 is an enlarged fragmentary cross-sectional view of an impeller side seal structure of a water pump bearing, according to a first embodiment of the present invention.

The seal structure of a first embodiment comprises a ring-shaped first seal unit having an outer circumferential portion fixed to an inner circumferential portion of the outer ring and an inner circumferential portion in sliding-contact with an outer circumferential surface of the pump shaft. As shown in FIG. 1, in the seal structure of the first embodiment, a ring-shaped second seal unit is disposed at an axially outer position from the first seal unit. And, the second seal unit has its inner circumferential portion fixed to an outer circumferential portion of the pump shaft and its outer circumferential portion in sliding-contact with the outer ring.

The first seal unit comprises a ring reinforcement and an elastic member reinforced by the ring reinforcement. An outer circumferential portion of the first seal unit is press-fitted in a fitting groove formed on an inner circumferential surface of the outer ring. A portion of the elastic member further extends from an end portion of the ring reinforcement on the pump shaft side toward the pump shaft for making sliding-contact with an outer circumferential surface of the pump shaft. That portion of the elastic member comprises a first lip portion extending diagonally in an axially inward direction to make sliding-contact with an outer circumferential surface of the pump shaft, and a second lip portion extending diagonally in an axially outward direction to make sliding-contact with an outer circumferential surface of the pump shaft.

The second unit comprises a ring reinforcement having a cylindrical portion extending in an axial direction and fixed to the pump shaft and a flange portion extending from the cylindrical portion toward the outer ring, and an elastic member reinforced by the ring reinforcement. A portion of that elastic member further extends from the outer ring side end portion of the flange portion of the ring reinforcement toward the outer ring comprises a third lip portion in sliding-contact with an axially outer end face of the outer ring.

Figure 2:
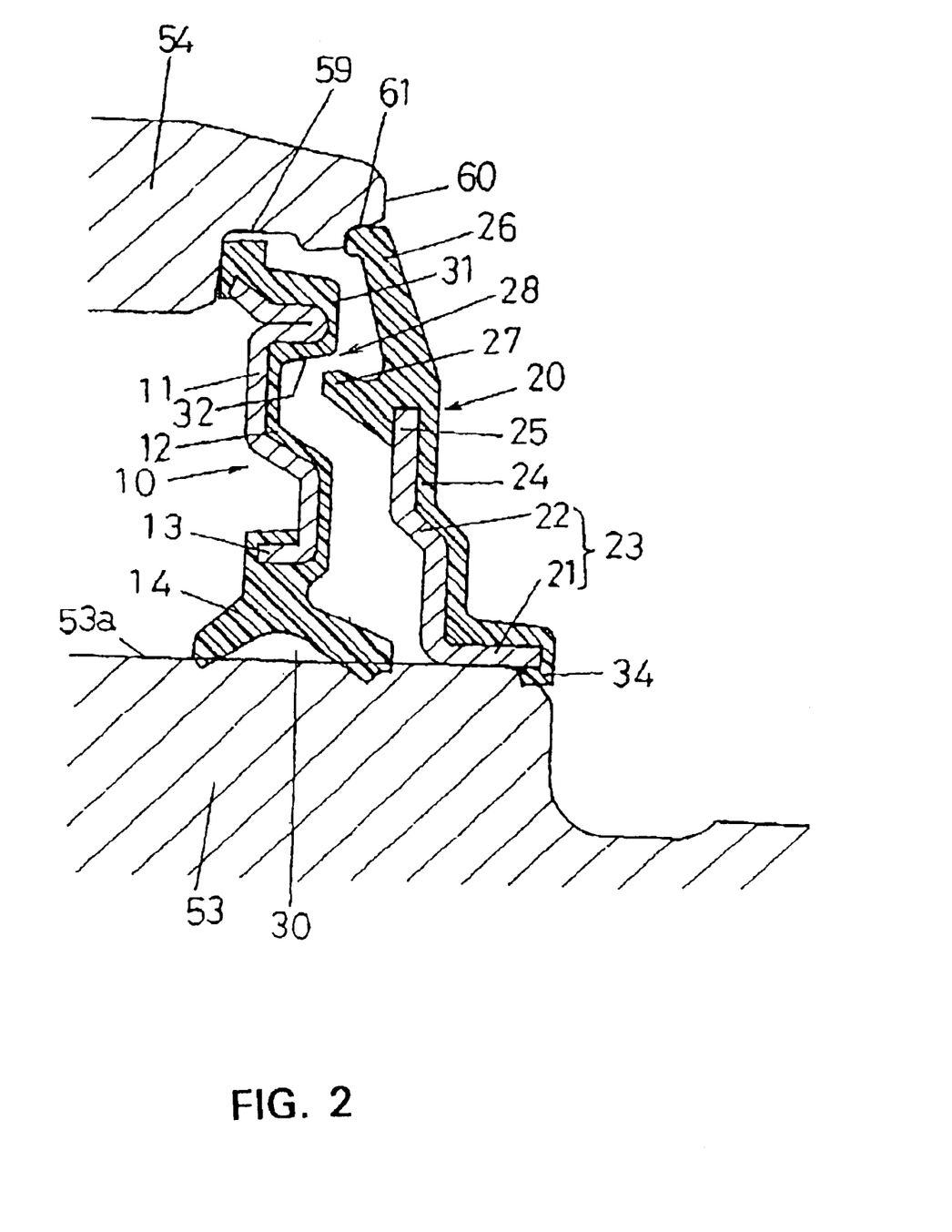
FIG. 2 is an enlarged fragmentary cross-sectional view of an impeller side seal structure of a water pump according to a second embodiment of the invention.

In the seal structure of a second embodiment, as shown in FIG. 2, a portion of the elastic member which constitutes the second seal unit is like the first seal structure, but a portion of that elastic member further extends from the outer ring side end portion of the flange portion of the ring reinforcement toward the outer ring further comprises a fourth lip portion extending diagonally in an axially inward direction to form a non-contact labyrinth seal portion between an axially outer lateral face of the first seal unit.

Figure 3:
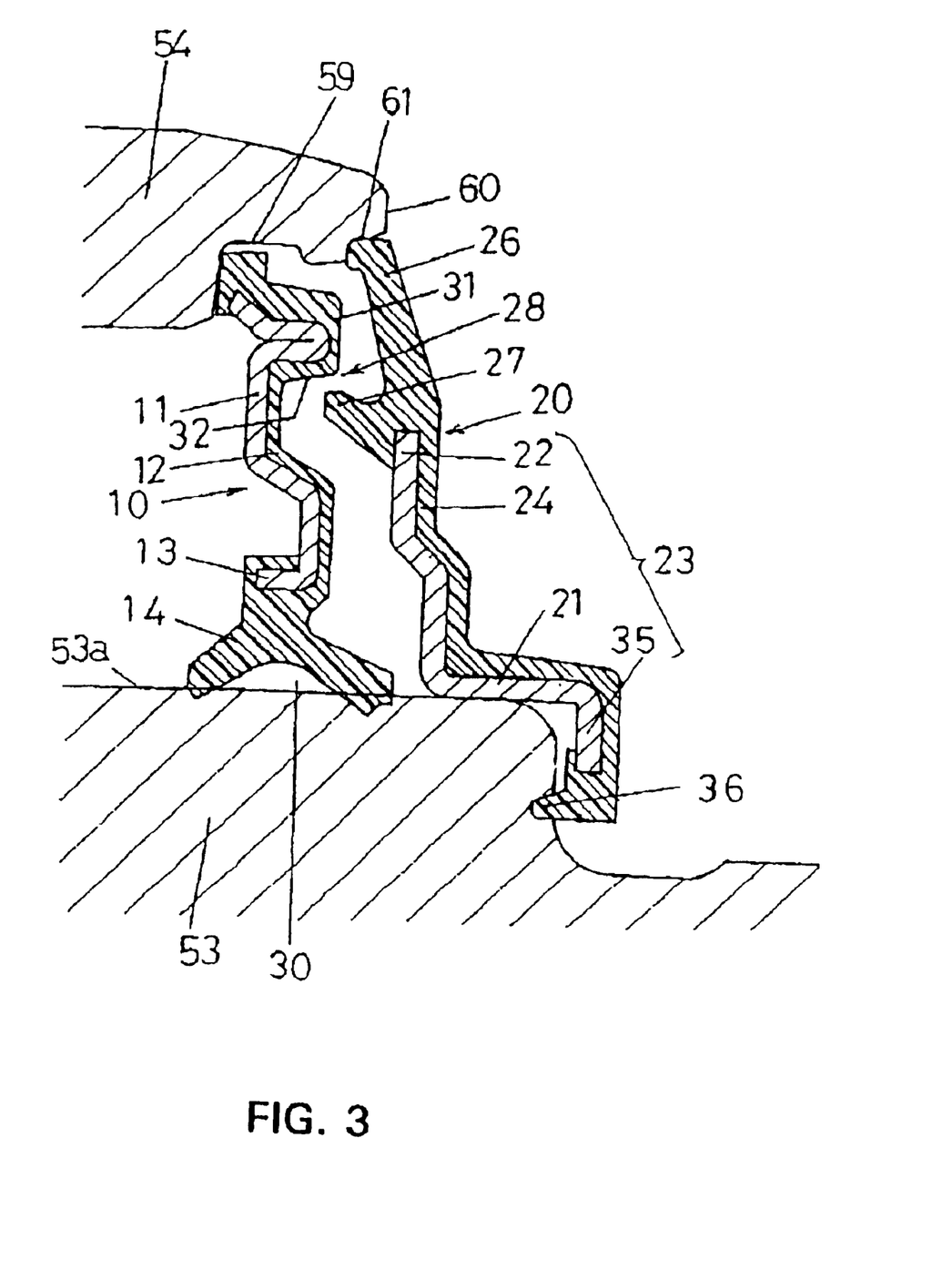
FIG. 3 is an enlarged fragmentary cross-sectional view of an impeller side seal structure of a water pump bearing according to a third embodiment of the invention.

In the seal structure of a third embodiment, as shown in FIG. 3, a ring reinforcement and an elastic member which constitute the second seal unit are like those of the first seal structure or the second seal structure, but a cylindrical portion of a ring reinforcement further has a reinforcing ring extending from the cylindrical portion toward radially inner direction along an axially outer end face of the pump shaft, and a portion of an elastic member existing at the side of radially inner part of it and reinforced by the said reinforcing ring comprises a fifth lip portion in sliding-contact with the axially outer end face of the pump shaft.

Figure 4:
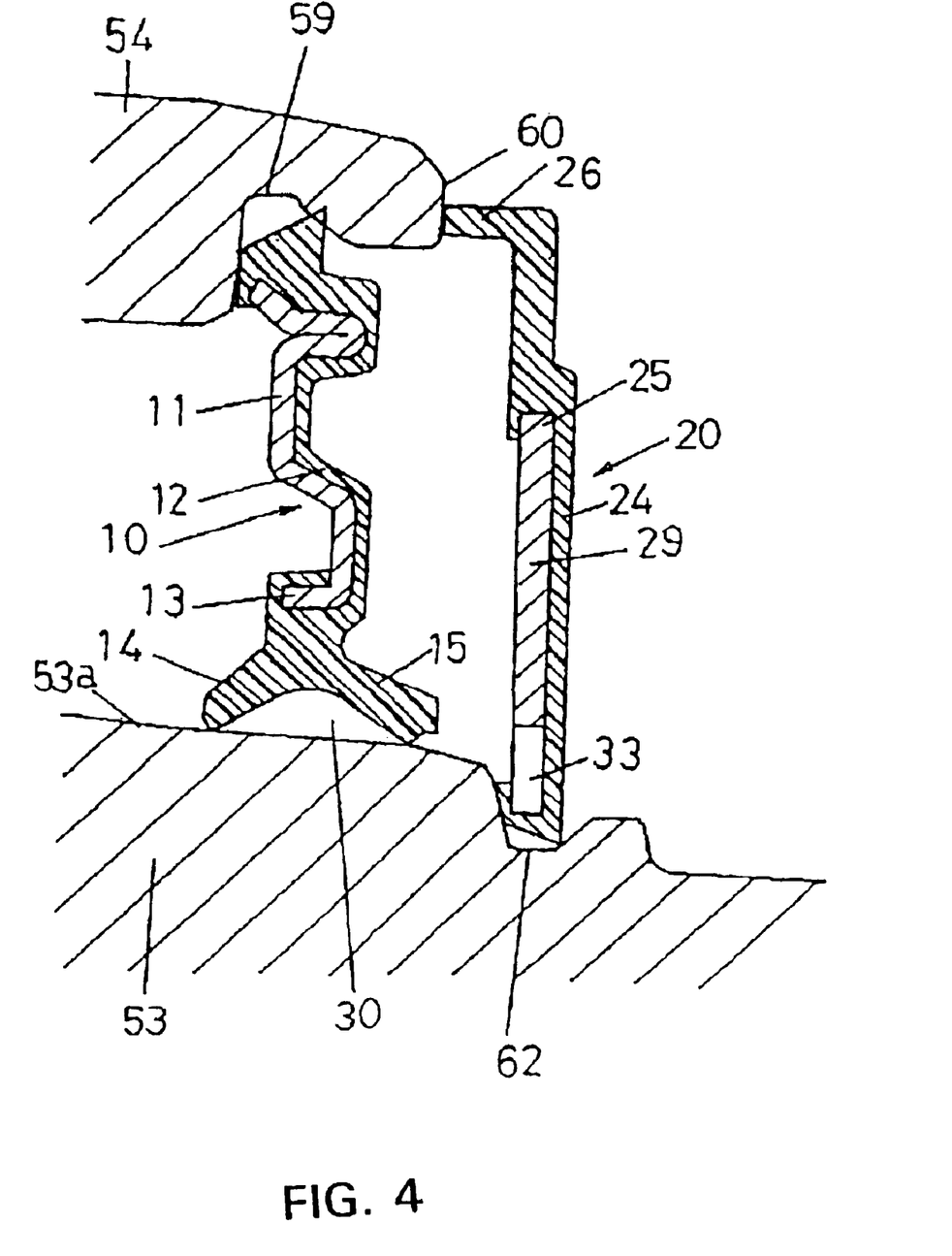
FIG. 4 is an enlarged fragmentary cross-sectional view of an impeller side seal structure of a water pump bearing according to a fourth embodiment of the invention.

In the seal structure of the fourth embodiment, as shown in FIG. 4, the second seal unit is like the first embodiment of a seal structure. It comprises a ring reinforcement and an elastic member reinforced by the ring reinforcement. The inner circumferential portion of the second seal unit is press-fitted in a fitting groove formed on an outer circumferential surface of the pump shaft. A portion of the elastic member further extends from the outer ring side end portion of the ring reinforcement toward the outer ring so as to form a third lip portion in sliding-contact with an axially outer end face of the outer ring.

Figure 5:
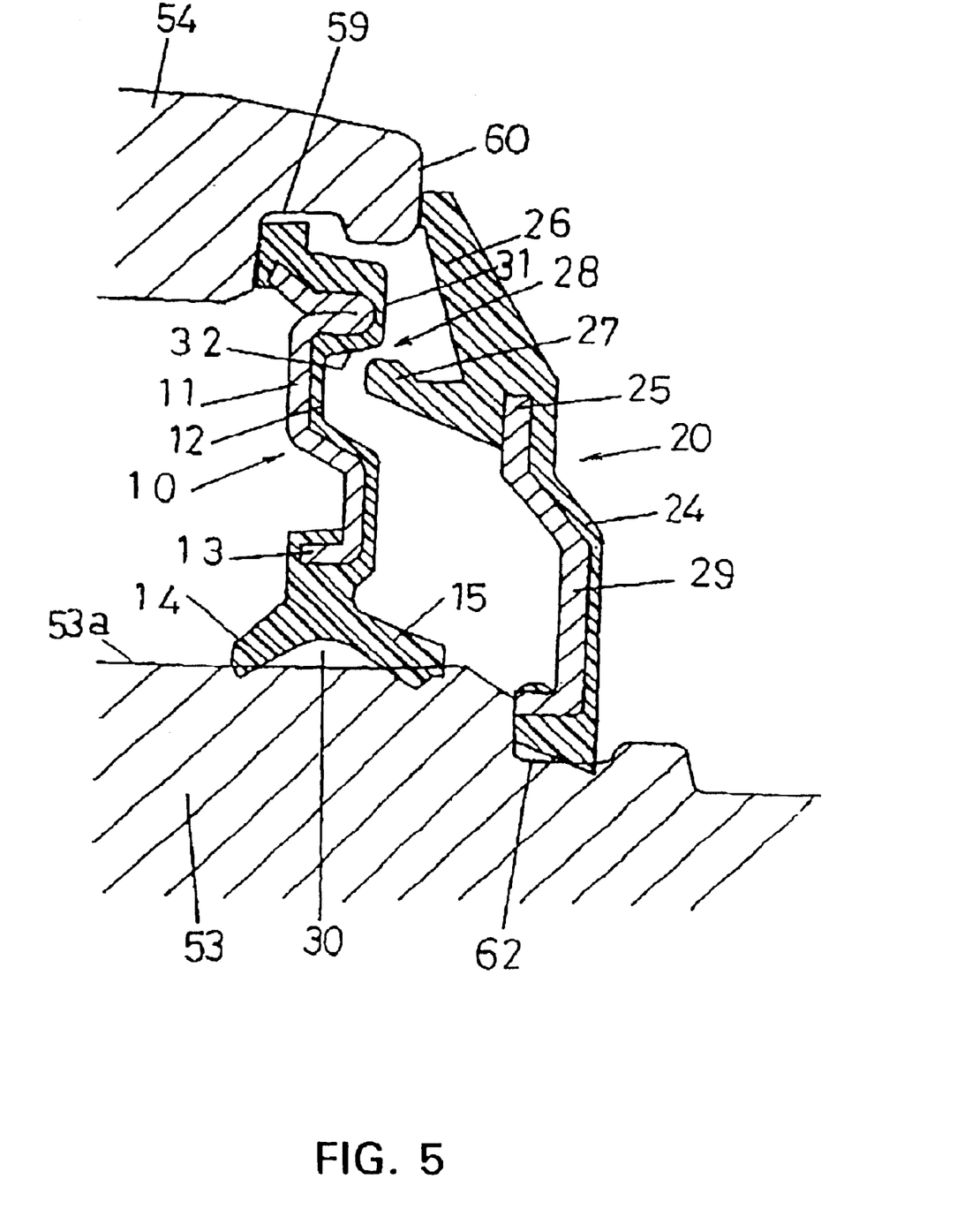
FIG. 5 is an enlarged fragmentary cross-sectional view of an impeller side seal structure of a water pump bearing according to a fifth embodiment of the invention.

In the seal structure of the fifth embodiment, as shown in FIG. 5, a portion of the elastic member constituting the second seal unit is like the fourth seal structure, but a portion of that elastic member further extends from the outer ring side end portion of the ring reinforcement toward the outer ring further comprises a portion extending diagonally in an axially inward direction to form a fourth lip portion that serves as a non-contact labyrinth seal portion between an axially outer lateral face of the first seal unit.

In a water pump bearing of the invention comprising a seal structure of any of the first to fifth aspects on the impeller side, as one of the seal structures provided at both end portions of the outer ring for sealing an internal area of the bearing, the third lip portion of the second seal unit can make sliding-contact with the axially outer end face of the outer ring that has a plain, e.g. a planar surface. It is also possible to provide an arc-shaped chamfer portion at an inner circumferential corner (on the pump shaft side) of the axially outer end face of the outer ring, so that the third lip portion makes sliding-contact with the arc-shaped chamfer portion.

According to the water pump bearing of the invention, the seal structure on the impeller side of the seal structures provided at both end portions of the outer ring for sealing the internal area of the bearing is comprised as follows. The structure comprises the ring-shaped first seal unit having its outer circumferential portion fixed to an inner circumferential portion of the outer ring and its inner circumferential portion in sliding-contact with an outer circumferential surface of the pump shaft, and the ring-shaped second seal unit disposed at an axially outer position from the first seal unit with its inner circumferential portion fixed to an outer circumferential portion of the pump shaft and its outer circumferential portion in sliding-contact with the outer ring. Therefore, penetration of moisture, such as cooling water or vapor etc., into the internal area of the bearing can be effectively prevented, and outflow of grease from the internal area of the bearing can also be effectively prevented.

More specifically, even if moisture, such as water or vapor, etc., has penetrated toward the internal area of the bearing through the seal portion between the third lip portion of the second seal unit and the axially outer end face of the outer ring, the second lip portion of the first seal unit, which diagonally extends in an axially outward direction and achieves sliding-contact with an outer circumferential surface of the pump shaft, prevents moisture, such as water or vapor, etc., from penetrating into the internal area of the bearing.

Also, the first lip portion of the first seal unit, which diagonally extends in an axially inward direction and achieves sliding-contact with the outer circumferential surface of the pump shaft, prevents grease from outflowing from the internal area of the bearing.

Further, in both of the foregoing cases, a sealed space enclosed by the first lip portion and the second lip portion of the first seal unit and the outer circumferential surface of the pump shaft can effectively prevent penetration of moisture, such as cooling water or vapor, etc., into the internal area of the bearing, as well as preventing outflow of grease from the internal area of the bearing.

Also, where the second unit further comprises the fourth lip portion that extends diagonally toward the outer ring and in an axially inward direction to form a non-contact labyrinth seal portion between an axially outer lateral face of the first seal unit, even if moisture, such as water or vapor, etc., has penetrated toward the internal area of the bearing through the seal portion between the third lip portion of the second unit and the axially outer end face of the outer ring, the labyrinth seal portion shakes off such moisture, thus effectively preventing further penetration of moisture, such as water, or vapor, etc., into the area of the bearing.

In any of the seal structures adopted in the water pump bearing of the invention, it is preferable that the ring reinforcements be made of a corrosion-resistant material, for example stainless steel, to avoid generation of rust on these components. In this sense the material is not specifically limited as long as these components are made of a corrosion-resistant material. For example, steel plated with a corrosion-resistant metal may be employed.

Also, elastic members may be of materials known in this technical field, such as rubber or synthetic resin.

Also, constitution, configuration and arrangement described in the following preferred embodiments referring to the accompanying drawings are merely a general presentation for reasonable understanding of the invention. Therefore, it is to be understood that the invention is not limited to the forms disclosed in the following embodiments, and that various modifications and variations may be made within the technical scope of the invention as set forth in the appended claims.

DESCRIPTION OF THE PREFERRED EMBODIMENTS

Referring to the accompanying drawings, descriptions hereunder are of preferred embodiments of seal structures adopted as a seal structure 56 on an impeller 51 side, which is among seal structures that are provided at both end portions of an outer ring 54 for sealing the internal area of the bearing. These have been adapted for use in the water pump bearing of the invention to constitute the essential part of the bearing. Since the portions other than the seal structures described below are the same as conventional ones described referring to FIG. 6, description of such other portions is omitted. Also, identical components to those referred to in FIG. 6 that illustrates a conventional example are denoted by identical reference numerals to those used in FIG. 6, and description thereof is omitted.

FIG. 1 shows a first embodiment of the impeller 51 side seal structure, which among at least two seal structures provided at both end portions of the outer ring 54 of the water pump bearing of the invention for sealing the internal area of the bearing.

The seal structure shown in FIG. 1 comprises a ring-shaped first seal unit 10 having an outer circumferential portion fixed to an inner circumferential portion of the outer ring 54 of the bearing and an inner circumferential portion in sliding-contact with an outer circumferential surface of a pump shaft 53. A ring-shaped second seal unit is disposed axially outward of the first seal unit 10. The unit 20 has its inner circumferential portion fixed to an outer circumferential portion of the pump shaft 53 and its outer circumferential portion in sliding-contact with the outer ring 54.

The first seal unit 10 comprises a metal ring reinforcement 11 and an elastic member 12 made of an elastic material such as rubber, reinforced by the ring reinforcement 11. The outer circumferential portion of the first seal unit 10 is press-fitted in a fitting groove formed on an inner circumferential surface of the outer ring 54.

The elastic member 12 further extends from the pump shaft side end portion 13 of the ring reinforcement 11 toward the pump shaft 53, thus achieving sliding-contact with an outer circumferential surface 53a of the pump shaft 53.

An inner circumferential portion, i.e. the pump shaft 53 side portion of the elastic member 12, comprises a first lip 14 and a second lip 15. A first lip 14 extends diagonally in an axially inward direction to make sliding-contact with an outer circumferential surface 53a of the pump shaft 53. A second lip portion 15 extends diagonally in an axially outward direction to make sliding-contact with an outer circumferential surface 53a of the pump shaft 53.

This forms a sealed space 30 enclosed by the first lip portion 14 and the second lip portion 15 of the first seal unit 10 and the outer circumferential portion 53a of the pump shaft 53.

The second seal unit 20 comprises a metal ring reinforcement 23 and an elastic member 24 made of an elastic material, such as rubber, reinforced by the ring reinforcement 23. As shown in FIG. 1, the ring reinforcement 23 comprises a cylindrical portion 21 extending in an axial direction and fixed to the pump shaft 53 and a flange portion 22 extending from the cylindrical portion 21 toward the outer ring 54.

A portion of the elastic member 24 further extends from an outer ring side end portion 25 of the flange portion 22 of the ring reinforcement 23 toward the outer ring 54. That portion comprises a third lip portion 26 in sliding-contact with an axially outer end face 60 of the outer ring 54, as shown in FIG. 1.

In the embodiment in FIG. 1, the outer circumferential portion of the first seal unit 10 is fixed to the inner circumferential portion of the outer ring 54 by pressing the first seal unit 10 toward an axially inward direction of the water pump bearing (the left side in FIG. 1), so that a lump-shaped outer circumferential portion of the first seal unit 10 is press-fitted in a fitting groove 59 formed on the inner circumferential portion of the outer ring 54. Once the outer circumferential portion of the first seal unit 10 has been fixed to the inner circumferential portion of the outer ring 54 in this way, the first lip portion 14 and the second lip portion 15 of the first seal unit 10 make sliding-contact with the outer circumferential surface 53a of the pump shaft 53, defining a sealed space 30 enclosed by the first lip portion 14, the second lip portion 15 and the outer circumferential surface 53a of the pump shaft 53.

Also, in FIG. 1, the cylindrical portion 21 is fixed over the pump shaft 53 by pressing the second seal unit 20 toward an axially inward direction of the water pump bearing (the left side in FIG. 1). Once the inner circumferential portion of the second seal unit 20 has been fixed to the outer circumferential portion of the pump shaft 53 in this way, the third lip portion 26 achieves contact with the axially outer end face 60 of the outer ring 54, thus forming a seal portion.

Further, in this embodiment the elastic member 24 of the second seal unit 20 extends to an inner circumferential edge portion of the cylindrical portion 21 of the ring reinforcement 23, forming a projection 34. When the inner circumferential portion of the second seal unit 20 is fixed to the outer circumferential portion of the pump shaft 53, this fixes the projection 34 of an elastic material with the metal outer circumferential surface 53a of the pump shaft 53, in addition to fitting of metal materials between the metal cylindrical portion 21 and the metal outer circumferential surface 53a of the pump shaft 53. Therefore, sealing capacity can be improved.

When the seal structure in FIG. 1 is adopted as the impeller 51 side seal structure, among seal structures provided at both end portions of the outer ring 54 for sealing the internal area of the bearing, dual ring-shaped seal units are employed at axially inner and outer positions. One of them is a seal unit that has its outer circumferential portion fixed to the inner circumferential portion of the outer ring 54 and its inner circumferential portion in sliding-contact with the outer circumferential surface of the pump shaft 53. The other of them is a seal unit that has its inner circumferential portion fixed to the outer circumferential portion of the pump shaft 53 and its outer circumferential portion in sliding-contact with the outer ring 54. Therefore, penetration of moisture, such as cooling water or vapor, etc., into the internal area of the bearing can be effectively prevented, and outflow of grease from the internal area of the bearing can also be effectively prevented.

More specifically, moisture that might penetrate into the internal area of the bearing is blocked by the seal portion formed between the third lip portion 26 of the second seal unit 20 and the axially outer end face 60 of the outer ring 54.

Further, even if moisture penetrates through the seal portion formed between the third lip portion 26 of the second seal unit 20 and the axially outer end face 60 of the outer ring 54 toward the internal area of the bearing, the second lip portion 15 of the first seal unit 10 diagonally extending in an axially outward direction and in sliding-contact with the outer circumferential surface 53a of the pump shaft 53 effectively prevents moisture from penetrating into the internal area of the bearing.

Also, the first lip portion 14 of the first seal unit 10 extends diagonally in an axially inward direction to achieve sliding-contact with the outer circumferential surface 53a of the pump shaft 53 and prevent outflow of grease from the internal area of the bearing.

Further, the sealed space 30 enclosed by the first lip portion 14 and the second lip portion 15 of the first seal unit 10 and the outer circumferential surface 53a of the pump shaft 53 can effectively prevent penetration of moisture, such as cooling water or vapor, etc., into the internal area of the bearing, and outflow of grease from the internal area of the bearing.

In addition, since the projection 34 of an elastic material is provided at the inner circumferential edge portion of the cylindrical portion 21 of the ring reinforcement 23, the projection 34 is fixed with the metal outer circumferential surface 53a of the pump shaft 53 once the inner circumferential portion of the second seal unit 20 is fixed to the outer circumferential portion of the pump shaft 53. This effectively prevents generation of rust on the metal cylindrical portion 21 and the metal outer circumferential surface 53a of the pump shaft 53.

In FIG. 1, the third lip portion 26 of the second seal unit 20 is in sliding-contact with the axially outer end face 60 of the outer ring 54 that has a plain, e.g., planar surface. It may also be preferable to provide an arc-shaped chamfer portion 61 at an inner circumferential corner (on the pump shaft 53 side) of the axially outer end face 60 of the outer ring 54, as in the embodiment in FIG. 2. Then the third lip portion 26 of the second seal unit 20 makes sliding-contact with the arc-shaped chamfer portion 61.

Also, while the flange portion 22 of the ring reinforcement 23 has a straight cross-section in FIG. 1, it may be formed such that the cross section is a curved shape, as in FIG. 2.

FIG. 2 shows a second embodiment of the impeller 51 side seal structure, which is among the at least one seal structures at both end portions of the outer ring 54 of the water pump bearing of the invention, for sealing the internal area of the bearing.

Since the basic cofiguration and structure of FIG. 2 are similar to FIG. 1, the same reference numerals are given to components used in common, and description thereof shall be omitted.

The embodiment in FIG. 2 differs from FIG. 1 in that a portion of the elastic member 24 constituting the second seal unit 20 extends further from the outer ring side end portion 25 of the ring reinforcement flange portion 22 and toward the outer ring 5 further comprises a fourth lip portion 27 diagonally extending in an axially inward direction so as to form a non-contact labyrinth seal portion 28 between an axially outer lateral face of the first seal unit 10.

In FIG. 2, the inner circumferential portion of the second seal unit 20 is fixed over the outer circumferential surface of the pump shaft 53 by pressing the second seal unit 20 in an axially inward direction of the water pump bearing (the left side in FIG. 2). Once the inner circumferential portion of the second seal unit 20 has been fixed to the outer circumferential surface of the pump shaft 53, the third lip portion 26 contacts the arc-shaped chamfer portion 61 formed at an inner circumferential corner (on the pump shaft 53 side) of the axially outer end face 60 of the outer ring 54, thus forming a seal. Concurrently, the not-contact labyrinth seal portion 28 is formed between a tip portion of the fourth lip portion 27 and the axially outer lateral face of the first seal unit 10.

Even if moisture has penetrated toward the internal area of the bearing through the seal portion between the third lip portion 26 of the second seal unit 20 and the axially outer end face 60 of the outer ring 54, the labyrinth seal portion 28 in FIG. 2 shakes off such moisture, thus effectively preventing further penetration of moisture into the internal area of the bearing. This is in addition to the effect and advantage of the embodiment of FIG. 1.

Further, the labyrinth seal portion 28 may be formed between a flat portion of the axially outer lateral face of the first seal unit 10 and the tip portion of the fourth lip portion 27 which extends diagonally in an axially inward direction and toward the outer ring 54, unlike the embodiment shown in FIG. 2.

However, forming a labyrinth seal portion 28 between a face 32 confronting the pump shaft 53 of a bulge portion 31 of the first seal unit 10 protruding in an axially outward direction and the tip portion of the fourth lip portion 27 as shown in FIG. 2, is advantageous for more effective prevention of penetration of moisture into the internal area of the bearing.

Further, in the embodiment of FIG. 2, it is preferable to arrange the third lip portion 26 of the second seal unit 20 to make sliding-contact with an axially outer end face 60 of the outer ring 54 that has a plain surface. In addition, the flange portion 22 of the ring reinforcement 23 may be formed to have a straight cross-section, as shown in FIG. 1.

FIG. 3 shows a third embodiment of the impeller 51 side seal structure, which is among the at least one seal structures at both end portions of the outer ring 54 of the water pump bearing of the invention, for sealing the internal area of the bearing.

Since the basic cofiguration and structure of FIG. 3 are similar to FIG. 2, the same reference numerals are given to components used in common, and description thereof shall be omitted.

The embodiment in FIG. 3 differs from FIG. 2 in that a cylindrical portion 21 of a ring reinforcement 23 further has a reinforcing ring 35 extending from the cylindrical portion 21 toward radially inner direction along an axially outer end face of the pump shaft 53, and a portion of an elastic member 24 existing at the side of radially inner part of it and reinforced by the said reinforcing ring 35 comprises a fifth lip portion 36 in sliding-contact with the axially outer end face of the pump shaft 53.

Since the fifth lip portion 36 of an elastic material is provided at the inner circumferential edge portion of the elastic member 24 in sliding-contact with the axially outer end face of the pump shaft 53, fifth lip portion 36 is fixed with the axially outer end face of the pump shaft 53 once the inner circumferential portion of the second seal unit 20 is fixed to the outer circumferential portion of the pump shaft 53. This can improve sealing capacity as well as this effectively prevents generation of rust on the metal cylindrical portion 21 and the metal outer circumferential surface 53a of the pump shaft 53. This is in addition to the effect and advantage of the embodiment of FIG. 2.

In the embodiment of FIG. 3, it is preferable to arrange the portion of the elastic member 20 further extends from an outer ring side end portion of the flange portion of the ring reinforcement toward the outer ring 54 to the portion shown in FIG. 1 as it does not have the fourth lip 27.

Also, in the embodiment of FIG. 3, it is preferable to arrange third lip portion 26 of the second seal unit 20 to make sliding-contact with an axially outer end face 60 of the outer ring 54 that has a plain surface. In addition, the flange portion 22 of the ring reinforcement 23 may be formed to have a straight cross-section, as shown in FIG. 1.

FIG. 4 shows the fourth embodiment of the impeller 51 side seal structure, which is one of the seal structures provided at both end portions of the outer ring 54 of the water pump bearing of the invention for sealing the internal area of the bearing.

Since the basic configuration and structure in FIG. 4 are similar to FIG. 1, the same reference numerals are given to components used in common, and description thereof shall be omitted.

The embodiment in FIG. 4 shows a difference from FIG. 1 in that the inner circumferential portion of the second seal unit 20 is press-fitted in a fitting groove 62 formed on the outer circumferential surface of the pump shaft 53.

Also, in FIG. 4, a ring reinforcement 29 of the second seal unit 20 which reinforces the elastic member 24 made of an elastic material, such as rubber, is provided with a plurality of slits formed in a radial direction and aligned in a circle at an inner circumferential portion thereof (on the pump shaft 53 side).

The inner circumferential portion of the second seal unit 20 is fixed over the outer circumferential surface of the pump shaft 53 by pressing the second seal unit 20 toward an axially inward direction of the water pump bearing (toward the left in FIG. 3), so that a lump-shaped inner circumferential portion of the second seal unit 20 is press-fitted in the fitting groove 62 formed on the outer circumferential surface of the pump shaft 53. And once the inner circumferential portion of the second seal unit 20 has been fixed to the outer circumferential surface of the pump shaft 53 in this way, the third lip portion 26 achieves contact with the axially outer end face 60 of the outer ring 54, thus forming a seal.

Referring to the mentioned process, since the ring reinforcement 29 of the second seal unit 20 is constructed as described above, the second seal unit 20 can be more easily and more firmly press-fitted because of a resilience of the ring reinforcement 29. As a result, sealing capacity against moisture such as cooling water or vapor etc. that is going to penetrate into the internal area of the bearing can be improved.

Also, the third lip portion 26 of the second seal unit 20 may make sliding-contact with the arc-shaped chamfer portion 61 at an inner circumferential corner (on the side of the pump shaft 53) of the axially outer end face 60 of the outer ring 54 shown in FIG. 2, instead of the form in which the third lip portion 26 of the second seal unit 20 is in sliding contact with the axially outer end face 60 of the outer ring 54 that has a plain surface.

Other effect and advantage are similar to those described with reference to the first embodiment shown in FIG. 1.

FIG. 5 shows a fifth embodiment of the impeller 51 side seal structure, which is one of the seal structures provided at both end portions of the outer ring 54 of the water pump bearing of the invention for sealing the internal area of the bearing.

Since the basic configuration and structure are similar to FIG. 2, the same reference numerals are given to common components, and description thereof shall be omitted.

FIG. 5 differs from FIG. 2 in that the inner circumferential portion of the second seal unit 20 is press-fitted in the fitting groove 62 formed on the outer circumferential surface of the pump shaft 53.

In FIG. 5, the inner circumferential portion of the second seal unit 20 is fixed over the outer circumferential surface of the pump shaft 53 by pressing the second seal unit 20 axially inward of the water pump bearing (toward the left side in FIG. 5), so that a lump-shaped inner circumferential portion of the second seal unit 20 is press-fitted in the fitting groove 62 formed on the outer circumferential surface of the pump shaft 53. Once the inner circumferential surface of the pump shaft 53, the third lip portion 26 contacts the axially outer end face 60 of the outer ring 54 thus forming a seal portion, and the non-contact labyrinth seal 28 is formed between a tip portion of the fourth lip portion 27 and the axially outer lateral face of the first seal unit 10.

Also, the third lip portion 26 of the second seal unit 20 may make sliding-contact with the arc-shaped chamfer portion 61 at the inner circumferential corner (on the pump shaft 53 side) of the axially outer end face 60 of the outer ring 54 as in FIG. 2, instead of the form in which the third lip portion 26 of the second seal unit 20 is in sliding-contact with the axially outer end face 60 of the outer ring 54 that has a plain surface.

Basic effect and advantage are similar to those described with reference to the second embodiment shown in FIG. 2.

According to the invention, a water pump bearing that can prevent penetration of cooling water or moisture into an internal area of the water pump bearing and outflow of grease from the internal area of the bearing can be obtained.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A water pump bearing, comprising;
   a pump shaft having an outer circumferential surface;
   an outer ring around the shaft the outer ring having an inner circumferential portion; the outer ring having an axial end face at a lateral side of the bearing;
   a rolling member located between the outer ring and the pump shaft enabling relative rotation between the outer ring and the pump shaft;
   a seal at the shaft and the outer ring located at the axial end of the outer ring and shaped and positioned for sealing an internal area of the bearing between the outer ring and the shaft, the seal comprising;
   a ring shaped first seal comprising a first elastic member, and having a first outer circumferential portion fixed to the inner circumferential portion of the outer ring and having a first inner circumferential portion which is in sliding-contact with the outer circumferential surface of the pump shaft;
   a fitting groove formed in the inner circumferential surface of the outer ring, the first outer circumferential portion of the first seal bearing fitted in the fitting groove in the inner circumferential surface of the outer ring;
   a first portion of the first elastic member extending toward the pump shaft for making sliding-contact with the outer circumferential surface of the pump shaft, the first portion of the first elastic member comprising a first lip extending diagonally and axially inward to make sliding-contact with the outer circumferential surface of the pump shaft and also comprising a second lip extending diagonally and axially outward to also make sliding-contact with the outer circumferential surface of the pump shaft, whereby the first and the second lips are spaced apart along and contact the pump shaft;
   a ring-shaped second seal disposed axially outward of the first seal and nearer to the axial end of the outer ring than the first seal, the second seal having a second inner circumferential portion fixed to the outer circumferential portion of the pump shaft and having a second outer circumferential portion in sliding-contact with the outer ring;

the second seal comprising a cylindrical portion extending in an axial direction and fixed to the pump shaft and further comprising a flange extending radially from the cylindrical portion and toward the outer ring; a portion of the second seal flange extending toward the outer ring and the flange portion comprises a third lip in sliding-contact with the axially outer end face of the outer ring.

2. The bearing of claim 1, wherein the first seal comprises a first ring reinforcement for the elastic member located radially outward from the pump shaft and having an inner end; the first portion of the first elastic member extending from the inner end of the first ring reinforcement and on the pump shaft side of the elastic member.

3. The bearing of claim 2, wherein the second seal comprises a second elastic member extending from the pump shaft into sliding-contact with the outer ring; a portion of the elastic member extending axially outward and being in sliding-contact with the axially outer end face of the outer ring, and a second ring reinforcement for the second elastic member, the second ring reinforcement having a cylindrical portion, and a ring portion extending from the cylindrical portion radially inward along an axially outer end face of the pump shaft, the second elastic member having a radial portion overlying the radially inner face of the ring portion and reinforced thereby, the radial portion terminating at its radially inner end in a lip portion in sliding-contact with the axially outer end face of the pump shaft.

4. The bearing of claim 3, further comprising a second ring reinforcement for reinforcing the second elastic member and having a cylindrical portion extending in an axial direction, wherein the second ring reinforcement is fixed to the pump shaft, the second ring reinforcement further comprises a second flange portion extending from the cylindrical portion thereof toward the outer ring, the flange portion of the second elastic member extending axially outward beyond the second ring reinforcement.

5. The bearing of claim 1, wherein the second seal comprises a second elastic member extending from the pump shaft into sliding-contact with the outer ring; a portion of the elastic member extending axially outward and being in sliding-contact with the axially outer end face of the outer ring.

6. The bearing of claim 5, further comprising a second ring reinforcement for reinforcing the second elastic member and having a cylindrical portion extending in an axial direction, wherein the second ring reinforcement is fixed to the pump shaft, the second ring reinforcement further comprises a second flange portion extending from the cylindrical portion thereof toward the outer ring, the flange portion of the second elastic member extending axially outward beyond the second ring reinforcement.

7. The bearing of claim 6, wherein the second elastic member extends from the outer ring side end portion of the second ring reinforcement.

8. The bearing of claim 7, wherein the portion of the second elastic member extending toward the outer ring further comprises a fourth lip extending diagonally, radially outwardly and also axially inward to form with an axially outer, lateral face of the first seal, a non-contact labyrinth seal between the first and second seals.

9. The water pump bearing of claim 5, wherein the portion of the second elastic member extending toward the outer ring further comprises a fourth lip extending diagonally, radially outwardly and also axially inward to form with an axially outer, lateral face of the first seal, a non-contact labyrinth seal between the first and second seals.

10. The bearing of claim 5, further comprising a fitting groove formed on an outer circumferential surface of the pump shaft; the inner circumferential portion of the second seal being press fit in the groove; and the portion of the second elastic member further extending toward the outer ring thereby forming a third lip in sliding-contact with the axially outer end face of the outer ring.

11. The bearing of claim 1, wherein the pump shaft has an end with an impeller thereon and the pump shaft has a pulley thereon spaced from the impeller; and the seal being at the impeller side of the shaft.

12. The bearing of claim 11, wherein the shaft has end portions and the impeller is at one of the end portions of the shaft and the pulley is at the other end portion of the shaft;

a further seal structure at the pulley end of the outer ring for sealing an internal area of the bearing between the seal at the pulley end of the shaft and the seal at the impeller end of the shaft.

* * * * *